US012124159B2

(12) United States Patent
Tait (10) Patent No.: US 12,124,159 B2
(45) Date of Patent: Oct. 22, 2024

(54) SPECIAL EFFECTS SYSTEM WITH AN ADJUSTABLE SHAPE AND SIZE PROJECTION SURFACE

(71) Applicant: Disney Enterprises, Inc., Burbank, CA (US)

(72) Inventor: Thomas Tracey Tait, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 140 days.

(21) Appl. No.: 18/108,275

(22) Filed: Feb. 10, 2023

(65) Prior Publication Data

US 2024/0272538 A1 Aug. 15, 2024

(51) Int. Cl.
*G03B 21/60* (2014.01)

(52) U.S. Cl.
CPC .................... *G03B 21/60* (2013.01)

(58) Field of Classification Search
CPC ........................................ G03B 21/58
See application file for complete search history.

(56) References Cited

U.S. PATENT DOCUMENTS 9,958,767 B1 * 5/2018 Reichow ................. G03B 21/58
11,559,750 B2 * 1/2023 Melo ...................... A63G 31/16

* cited by examiner

*Primary Examiner* — Leon W Rhodes, Jr.
(74) *Attorney, Agent, or Firm* — Dorsey & Whitney LLP (57) ABSTRACT

A special effects system designed to provide a projection surface or screen that can be animated or dynamically altered in its shape and/or size over time while video content is being concurrently projected from a video projector onto the altering projection surface. The video content and projection surface alterations are synchronized in time, e.g., on a pixel basis or other level of precision in some cases, such that the size and/or shape of the projected imagery, e.g., of a character, an animated object, and/or the like, matches that of the size and shape or outline of the present state of the dynamically alterable projection surface.

19 Claims, 6 Drawing Sheets

FIG.4A

SPECIAL EFFECTS SYSTEM WITH AN ADJUSTABLE SHAPE AND SIZE PROJECTION SURFACE

BACKGROUND

1. Field of the Description

The present description relates, in general, to video projection systems used to create special effects with a unique visual component, and, more particularly, to a system (and associated methods) for providing a projection surface or screen with a shape and size that can be dynamically altered (e.g., the projection screen can be animated) to better match projected two dimensional (2D) or three dimensional (3D) video images (e.g., video content) that change over time.

2. Relevant Background

Today, there is a strong demand for eye-catching special effects to entertain visitors and to encourage the visitors to return to a venue again and again. For example, theme park operators design attractions such as rides and waiting spaces for such attractions to include exciting and, often, realistic special effects. Often, it is desirable for the special effects to include characters or objects that appear to be dynamic or animated such as a movie character or action hero that performs some movements or actions while attraction visitors are present within a nearby viewing space. Venue operators continue to search for ways to provide special effects with interesting visual aspects in a repeatable and cost-effective manner.

One technique for providing a dynamic character or object is through the use of robotics. In many theme parks, animatronic characters have been provided along ride paths for many years. While these characters can be quite realistic and provide a repeatable effect, they can be difficult, time consuming, and expensive to design, install, and maintain, and robotics-based effects can also be difficult to modify to achieve new or different effects.

More recently, unique special effects have been created by projecting video onto nonstandard projection screens. For example, some special effects systems include a precision projection surface produced for use in projection illusions in theme park rides and attraction in which the observers may be static or moving in the viewing space. Typically, the projection surface takes the form of a silhouette of a human or a character, with a fixed size and shape and with video content selected to match and suit the static silhouette's size and shape. Such projection surfaces or screens can effectively serve as a high-fidelity alternative to an audio animatronic or robot. In one exemplary implementation, a high-resolution image, typically of a person, is projected onto a precision cut screen that provides a life-size outline of the image being projected, and, in some cases, the projection screen is placed in motion during projection.

SUMMARY

The inventors recognized that one problem with prior projection-based special effects systems is that the projection surface had a fixed size and shape which presents a static silhouette or outline. Some systems configured the projection screen to have some bas relief, but this aspect was also static or fixed. Due to the fixed nature of the projection surface in these systems, the special effects that they can produce are limited in their effectiveness because the outline of the projected image cannot change during projection such as to change as a projected image of a character moves naturally through a space.

To address these and other recognized problems, a special effects system was designed by the inventors to provide a projection surface (or screen) that can be animated or dynamically altered in its shape and/or size while video content is being projected from a video projector. The video content and projection surface alterations are synchronized in time (e.g., on a pixel basis or other level of precision in some cases) such that the size and/or shape of the projected imagery (e.g., of a character, an animated object, and/or the like) matches that of the size and shape (e.g., the outline) of the present state of the dynamically alterable projection surface.

More particularly, a system is provided for generating unique visual special effects that can change over time in size and shape. The system includes projector assembly, e.g., one or more video projectors, operable to project a first image and a second image differing in size or shape from the first image. A projection screen assembly is included in the system that has a screen extension assembly and one or more screen material segments supported on a support frame to provide a base projection surface facing a viewing space. The system further includes a controller configured to operate the screen extension assembly in a first state to provide the base projection surface and in a second state to provide an extended projection surface including the base projection surface and differing from the base projection surface in at least one of size and shape.

The controller is further configured to operate the projector assembly to project the first image onto the base projection surface during operation of the screen extension assembly in the first state and to project the second image onto the extended projection surface during operation of the screen extension assembly in the second state. In some embodiments, the first and second images are video images, and the controller operates the projector assembly to project transition content between the first and second images during the time period when the controller operates the screen extension assembly to transition between the first and second states.

In some embodiments, the one or more screen material segments is a sheet(s) of elastic material (which is also typically opaque or nearly so). In such embodiments, the screen extension assembly is configured to stretch the sheet of elastic material in a direction transverse to the base projection surface (which may be planar) to provide a three-dimensional (3D) shape in the extended projection surface that differs from the 3D shape of the base projection surface. The screen extension assembly may include a driver operating in response to control signals to move an end effector toward and away from an inner surface of the sheet of elastic material (e.g., a surface opposite the viewing space) to create a raised portion in the extended projection surface. The end effector may have a curved surface facing or abutting the inner surface of the sheet of elastic material.

In the same or other embodiments, the screen extension assembly may include a plurality of extendable screen supports each mounted on the support frame and each supporting a screen material extension. The screen extension assembly further may include a plurality of drivers each being operable in response to a control signal from the controller to provide linear movement of one of the extendable screen supports to extend at least a portion of one of the screen material extensions beyond a peripheral edge of the base projection surface to form portions of the extended projection surface. The linear movement can be in a plane parallel to a plane containing the base projection surface so that the base and extended portions are nearly planar. The plurality of extendable screen supports can, in some cases, each be housed within a C channel or similar elongated support element. The drivers each may take the form of a servo motor (mounted in a staggered or offset manner on stacked C-channels or support elements), and, in many cases, it is desirable for the drivers to be independently addressable and operable by the controller to define the size and shape of the extended projection surface over time.

DETAILED DESCRIPTION OF THE PREFERRED EMBODIMENTS

Briefly, the following description describes a special effects system that operates to produce a video-based visual effect that includes video images or imagery that varies in size and/or shape over time. Uniquely, the system includes a projection screen assembly that is configured to provide a shape and size altering projection surface rather than a conventional screen with a static or fixed outline.

To this end, the projection screen assembly includes one-to-many screen extension assemblies each operable (independently and concurrently) to: (1) alter the location of the outer edge or outline/silhouette boundaries of the projection surface (e.g., a 2D modification of shape and size of a generally planar projection surface) and/or (2) modify the 3D shape of (or to provide a non-planar configured to) the projection surface. The altering of the "base" or default projection surface over time is synchronized with changes in the projected video content, with accuracy at the pixel or near pixel level in some cases, such that the projected video image typically fills the altered projection surface without or with minimal blowby. In brief, the special effects system is adapted to animate the projection surface to match the changing video effects.

Figure 1:
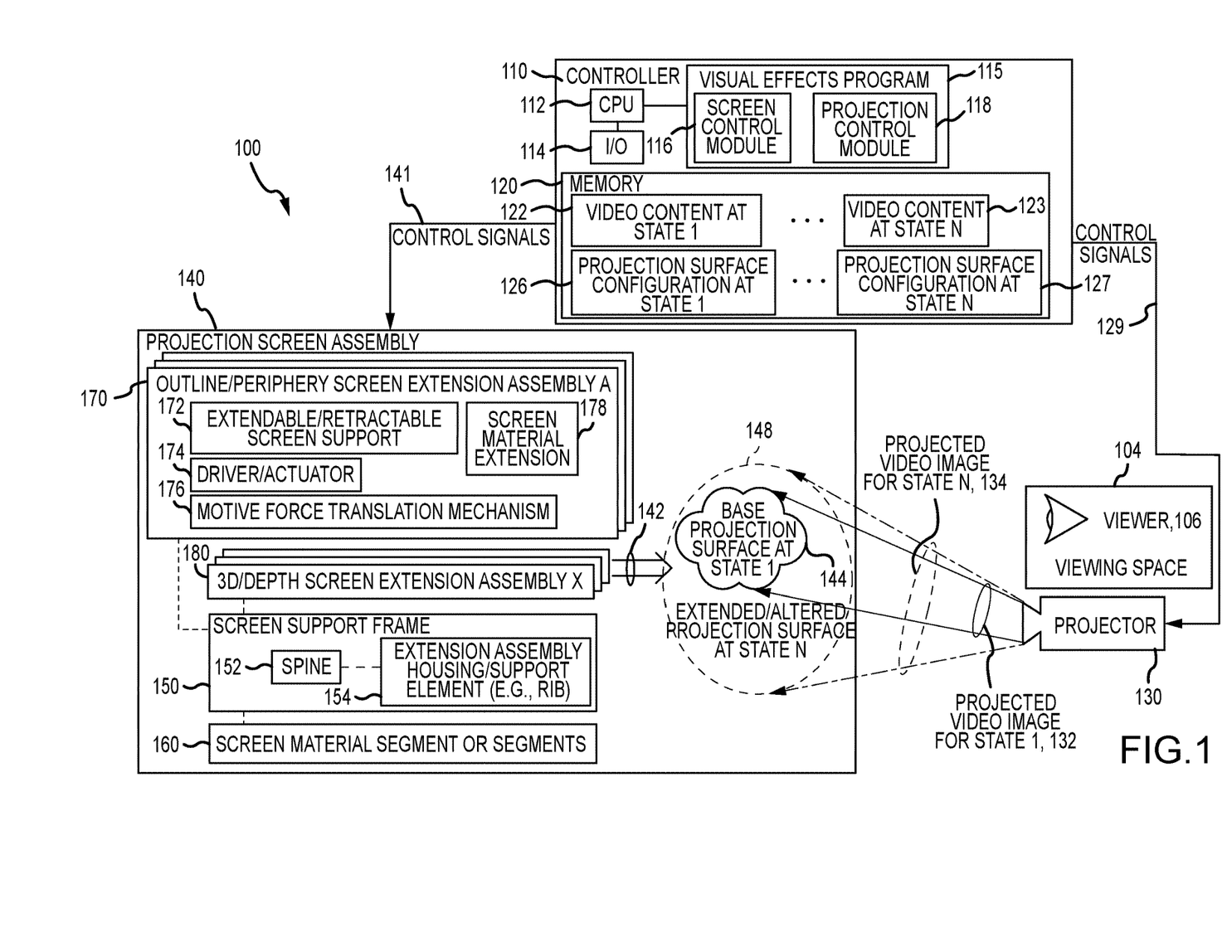
FIG. 1 is a functional block diagram of a special effects system configured according to the present description to provide a shape altering projection screen.

FIG. 1 is a functional block diagram of an exemplary special effects system 100 configured to provide a projection surface that can be modified during operation of the system 100 in shape and/or size to suit a particular projected image or to achieve a desired changing visual effect. As shown, the system 100 includes a controller 110 with a processor 112, input/output (I/O) devices 114, and memory/data storage 120 (which may be local or remote and accessible by the processor 112 via I/O devices 114). The controller 110 may take the form of nearly any computing device configured to generate and communicate control signals 129 and 141 to a projector(s) 130 and to a projection screen assembly 140, and the I/O devices 114 may be adapted to provide such digital communications in a wired or wireless manner.

The processor 112 is configured to manage the I/O devices 114 and storage and retrieval of data from the memory 120. Further, the processor 112 acts to execute code or executable instructions/programs to provide the functions described herein of a visual effects program 115. In this regard, the program 115 may include a screen control module or algorithm 116 configured to generate the control signals 141 to modify or alter the shape or size of the projection surface as shown with arrow 142. The program 115 further includes a projection control module 118 configured to generate the control signals 129 causing a projector (e.g., a video projector) 104 to project light to provide video imagery/images as shown with arrows 132, 134 causing a video image to be visible to a viewer 106 in a viewing space 104 that is nearby (e.g., 6 to 20 feet with 15 or more being useful in some implementations of system 100) the screen assembly 140.

The generation of control signals 129 and 141 are designed to cause the operation of the projector 130 and the projection screen assembly 140 (and altering of the projection surface 144, 148) to be time synchronized. Particularly, the memory 120 is shown as storing video content 122 and 123 associated with differing video imagery to be projected when the projection surface 144, 148 is in differing states (i.e., differing sizes and/or shapes) as affected by the projection screen assembly 140. The differing video content 122, 123, for example, may require that the screen assembly alter the projection surface 144 from a base state (size and shape) to a second or altered/extended state 148 (second size and/or shape differing from the base state's size and/or shape). This may be useful for showing a character standing to walking to running to squatting and so on, with each "state" or stage of the video content requiring a different projection screen outline or silhouette. The projection control module 118 transmits the different video content 122, 123 associate with the different effect stages or states in a precisely timed manner for projection as shown at 132 and 134 by operation of the projector 130.

The memory 120 is further shown to store projection surface configurations 126 and 127 at the states associated with the video content 122, 123. These configurations 126, 127 define the size and shape of the extended/altered projection surface 148 (or modifications required to the base projection surface 148 and its size and shape). The screen control module 116 is configured to processes these definitions/configurations 126, 127 to generated and communicate the control signals 141 to operate the projection screen assembly 140 as shown with arrow 142 to alter the base projection surface 144 (or return to it) to create the extended/altered projection surface 148 in a manner that is time synchronized with the changes from a base or initial video projected image 132 to a second state video projected image 134 by projector 130 (associated with content 122 and 123). The precision or accuracy of this synchronization may vary to implement the system 100 with some implementations achieving the timing on a pixel-by-pixel basis (e.g., the surface area demanded for a projected image 132 or 134 is matched by the adjustment 142 to the projection surface 144 to 148 or vice versa). To this end, the video content may include transitional video content to account for the time required to move the projection surface from a first state 144 to a desired end or second state 148 (e.g., the projected video image 132, 134 changes dynamically in size and/or shape with the animated or changing projection surface 144, 148 or transitional states/configurations between states 144 and 148).

To provide the base projection surface 144 that can be altered 142 into an extended/altered projection surface 148, the projection screen assembly 140 includes a screen support frame 150. The frame 150 can take a variety of forms to implement the assembly 140 as long as it functions to support a set of screen extension assemblies 170 and 180 and, in some cases, screen material segment or segments 160. The screen support frame 150 may be made up of one or more spines 152, which may often be elongated vertical members combined with a plurality of ribs or extension assembly housing or support elements 154. Each of these housing or support elements or ribs 154 may be used to house or provide a mounting location for one or more of the extension assemblies 170 and 180, and these may be spaced apart in a parallel arrangement along the spine 152 (as horizontal cross members, for example) or stacked closely together or in an abutting arrangement. The stacked or abutting arrangement of the housing/support elements 154 may be useful to limit seams or spaces between screen material segments 160 and/or screen material extensions 178 (as discussed further below).

The outer ends or edges of the extension assembly housing/support elements or ribs 154 often will define the outline or silhouette (i.e., the dimensions or size and shape) of the base projection surface 144. This is because the ribs 154 are used to support the screen material used to provide the base projection surface 144. Particularly, the screen material, such as an opaque plastic, may be provided as a single piece or segment 160 with edges matching those of the outer most portions of the set of ribs 154. In other cases, a plurality of segments 160 are provided with each covering a surface of one of the ribs 154 (e.g., elongated or rectangular pieces of screen material covering a surface of the ribs 154 facing the viewing space 104) such that together these segments 160 provide the base projection surface 144. In still other implementations of the assembly 140, the screen material segment 160 is provided as a sheet of resilient, stretchable material (e.g., Spandex, Lycra, or the like) that is opaque or relatively opaque even when in extended/altered form of surface 148, and this single sheet of material is placed over or attached to the outer edges/ends of the ribs 154 (or contact features of the 3D/depth screen extension assemblies 180, in some cases) to provide the base projection surface 144.

To provide modifications or altering of the base projection surface 144, the assembly 140 includes the outline or periphery screen extension assemblies 170. Each of these may be mounted upon and/or housed (partially or wholly) within one of the ribs 154 and may be configured to operate to change the outline or peripheral boundaries of the base projection surface 144 to form the extended/altered projection surface 148. To this end, each assembly 170 may include an extendable and retractable screen support 172 upon which is mounted a screen material extension 178 (e.g., a section of the material used to form the screen material segment or segments 160). For example, a rectangular or elongated length of screen material (e.g., a hard plastic) may be affixed to each screen support 172.

The assemblies 170 each also include a driver or actuator 174 (e.g., a servo motor or the like) operable in response to control signals 141 to extend or retract the screen support 172 from an edge/end of one of the ribs 154 so as to modify (e.g., increase or decrease) a size and shape of the projection surface by exposing a portion of the screen material extension 178 (e.g., making more (or less) screen material available to be projected upon by the projector 130). A motive force translation mechanism 176 (such as a spool for receiving a length of the screen support 172 and material 178 along with couplings to the driver 174) is provided in the assembly 170 to translate motion provided by the driver 174 into a linear movement of the screen support 172 relative to an end/edge of the rib 154 upon which it is mounted.

Typically, the ribs 154 are arranged to be planar or generally planar, and the operation of the assemblies 170 causes the shape or size of the projection screen to be altered generally in a single plane that is orthogonal to the projector 130 (e.g., to the angle of incidence). To provide a 3D or depth-type of change in the base projection surface 144, the projection screen assembly 140 may include one or more 3D/depth screen extension assemblies 180, with the screen material segment 160 taking the form of a resilient material sheet(s). The assemblies 180 may each include one or more screen contacting/deforming component, such as a semicircular head on the end of a shaft. This component is moved during operations of the assembly 180 to contact the screen material segment 160 at a contact point, with the assemblies 180 arranged to provide a plurality of such contact points spaced apart in a desired pattern.

The assemblies 180 each also include a driver/actuator such as driver 174 that is operable in response to the control signals 141 to move the support shaft to cause the screen contacting/deforming component. This movement is typically linear in a direction transverse to the plane of the base projection surface to provide a change in the 3D shape of the projection surface (e.g., from a planar surface 144 to a 3D surface 148). However, in some cases, the movements may be within the plane of the base projection surface 144 (e.g., to stretch the corners of the projection surface 144 outward to new locations for surface 148 and then vice versa to return to the surface 144 (e.g., a smaller triangular (or other-shaped) projection surface 144 may be enlarged in size to provide the projection surface 148).

As will be understood by those in the art, there are numerous techniques for implementing the screen extension assemblies 170 and 180 and the screen support frame 150 to provide a dynamically changing or animated projection surface (as shown with base surface 144 being altered or modified to become projection surface 148 that in this differing or second state has a different size and/or shape than surface 144). However, it may be useful at this point in the description to describe exemplary designs for each of the assemblies 170 and 180.

With regard to the screen support frame 150, this mechanism may be implemented with a design that includes a central vertical spine provided up the center of the projection surface (e.g., centrally located relative to the base projection surface 144 and, in some cases, of the projected image or character/object 132). The spine may be populated with multiple horizontal C channels stacked on top of each other (each acting as one of the extension assembly housings/support elements 154 shown in FIG. 1 to be attached to the spine 152). Each C channel may be, for example, 5 to 7 millimeters (mm) tall and extend outward from the spine to the right and left as far as desired to form the custom shape of the base projection surface or to define the minimum possible outline or periphery of the projection surface. Some C channels may extend further to the left or right of the spine to accommodate the basic form of the projected figure or object, and the spine may not be linear or straight in some implementations and may not be vertical (e.g., could be horizontal or some angular orientation in between vertical and horizontal). The height of the overall base projection surface (and projected figure/object) divided by height of each C channel (times two) would dictate the resolution and fabricating cost of the projection screen assembly, with smaller heights for the C channels being useful in some cases to provide better resolution at the periphery or outline but at higher costs.

To implement the screen extension assembly 170, each of the C channels may be fitted with two cable driven extension rods that telescope within the C channel. In a simple form, the length of travel is limited to the distance from the spine to perhaps within several centimeters of the end of the C channel, but other designs may provide more complex telescoping units such as with cables that enter near the opposite end of a C channel and cross the spine. Each left and right (or first and second) extension unit can be fitted with a section of rigid projection screen material to provide the screen material extensions 178 of FIG. 1. This screen material section may interlock with the surface on the rod above and below. The outer side of the central member of the C-channel may be faced with the same projection screen material (e.g., a very thin sheet of opaque plastic such as PVC or the like).

When viewed from closeup, the seams in the projection screen material may be evident, but the spacing between C channels would be selected such that at expected viewing distances for a viewer in the viewing space (e.g., about 15 feet) and under front projection the plurality of screen material extensions on the channels and extendable screen supports would appear to be a solid surface. Slight texturing of the screen material may be useful to further hide the presence of seams or gaps between screen material segments. Note, when robust channels with minimum heights are used, they need not be installed so as to be stacked tightly and/or abutting each other. For example, if the basic C channel is relatively small (such as 7 mm tall), they can be installed on offset vertical centers (e.g., 25 mm vertical centers) with screen material segments 160 chosen to cover gaps/seams (e.g., 25 mm high projection screen segments), which may be adequate for some resolution requirements (e.g., a 1-inch resolution) for the projection surface.

The cables of the outline/periphery screen extension assembly may be driven by small motors and a coil on spools. This may take a form matching or similar to a robust, precision automotive power antenna assembly or the like, and it may be powered using PoE. Each motor and spool may be larger than the inner dimension of the C channel, which may lead to external mounting at offsets behind the spine at different depths. In some implementations, extending and retracting is achieved using pneumatic drives in place of motor and spool combinations.

In some preferred embodiments, each of the drivers (e.g., servo motors or the like) would be independently operable or addressable. The screen control module 116 may take the form of a software suite that is configured to program and drive the motors to alter the projection surface in synchronization with projected content (and its size and shape). One technique for developing the screen control module 116 would involve autocalibration. This may involve playing back an alternate version of the media file from the projector with a key color around the figure/object media. A custom alpha channel can be recorded as the media plays versus the animation of the projection screen assembly, and, on a second pass, the accuracy can be verified automatically such as down to a pixel or other desired accuracy in the synchronization.

As discussed above with reference to FIG. 1, the screen material segment 160 may be a single sheet of projection material that is used to over or skin at least one side off the screen support frame 180. To this end, the projection screen material may be resilient material such as Spandex or the like. This may result in a limit to the range of motion as the material may only be stretched a particular amount. However, use of a covering skin as the segment 160 would allow for a reduction in the number of outline/periphery screen extension assemblies used to define the silhouette or outline of the projection surfaces 144, 148. Further, though, it would allow the 3D/depth screen extension assemblies 180 to be operated to provide modifications in the depth of the base projection surface 144 (which may be planar) in creating the altered projection surface 148, and this would allow the projected image to also have changing depth.

The 3D/depth screen extension assembly 180 could include extendable/retractable screen supports with end effectors that can be in contact with (or be moved to be in contact with) the inner surfaces of the screen material segment (or resilient cover). These end effectors can be planar, pointed, or curved in shape (such as a disc, a spherical shaped element, or the like), and they can be 3D printed forms in some cases. The drivers (e.g., motors) can be independently operated (or for similar or differing movements) to cause the supports with their end effectors transverse to the plane of the base projection surface (e.g., transverse to the plane containing the spine) to push forward from the spine toward the viewing space and any viewers located there and later to pull back toward the spine and their initial positions (e.g., to return the projection surface to its initial or base configuration which may be planar).

With a projection surface that can change its 3D shape, a wide variety of visual effects may be achieved during operation of the system 100. For example, a character could be projected walking forward (e.g., with a moving base projection surface) and then extend their hand outward toward the viewing space while holding an object, with their extended hand and object being projected onto the projection surface at the location of one or more of the end effectors pushing outward on the screen material. This allows real depth to be exhibited when a few seconds previously the figure was projected on a planar surface, e.g., the character was projected standing with their hands at their sides. In another example, a figure could be provided walking sideways to enter an area from the wings and then turn toward the viewing space and have their entire silhouette change as they walk directly toward the audience in the viewing space while having depth for shoulders at the beginning and a relatively flat torso at the end of the special effect.

The outline/periphery screen extension assemblies 170 shown in FIG. 1 would enable the system 100 to be used to project a character that changes shape and size such as a character who changes their shape over time (e.g., start from a sideways profile view and turn to face the projector) and may be wearing a flowing cape that unfurls during projection. The character could also tile or turn their head to either side instead of being forced to hold their head in a static position. The character may even be able to extend an arm or leg or move a held object away from and toward their body.

Figure 2A:
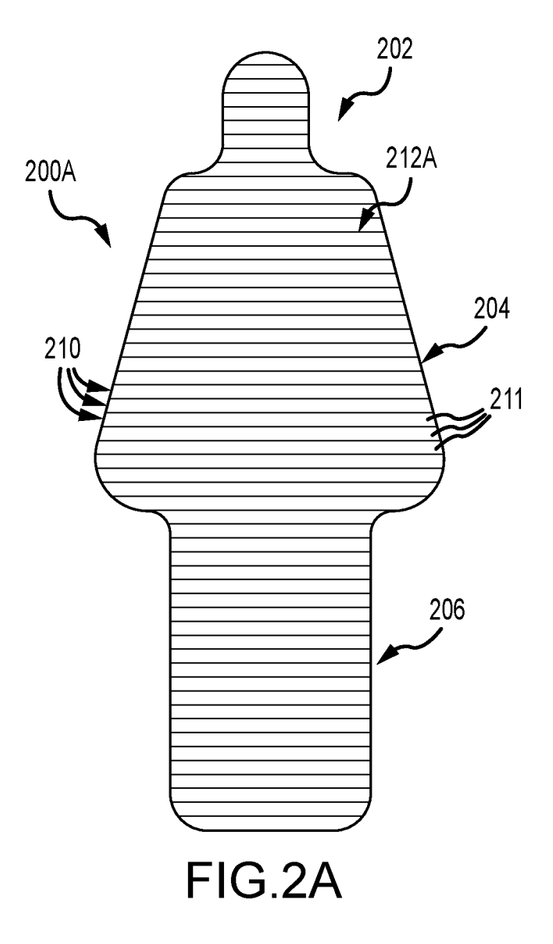
FIGS. 2A-2F illustrate one exemplary projection screen assembly that may be used in the system of FIG. 1 and that is shown in an initial or base state prior to and after projection of video content, in a second state prior to and after projection of a second video content, and in a third state prior to and after projection of third video content.
Figure 2B:
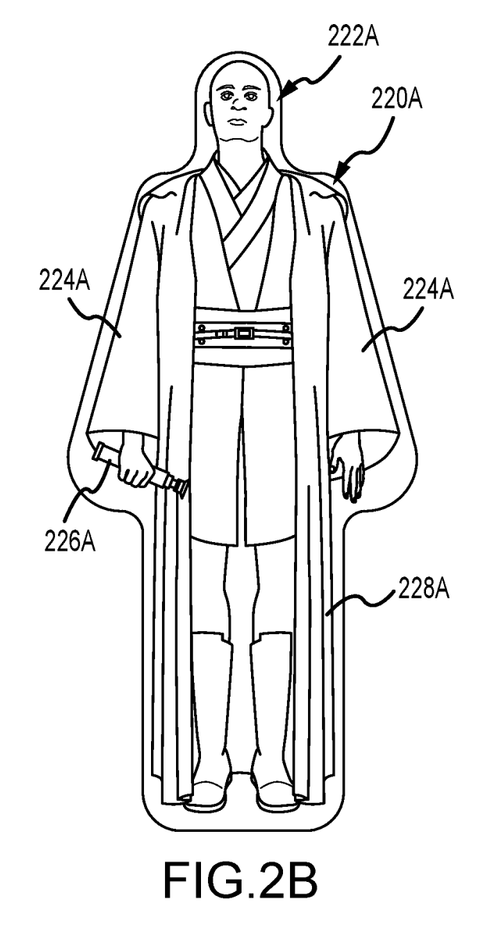
Figure 2C:
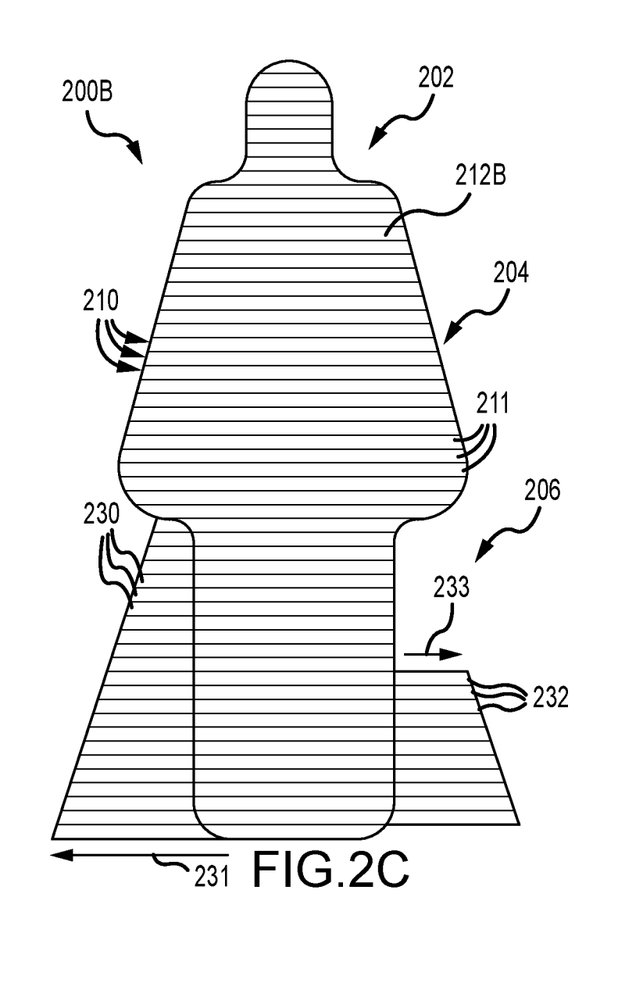
Figure 2D:
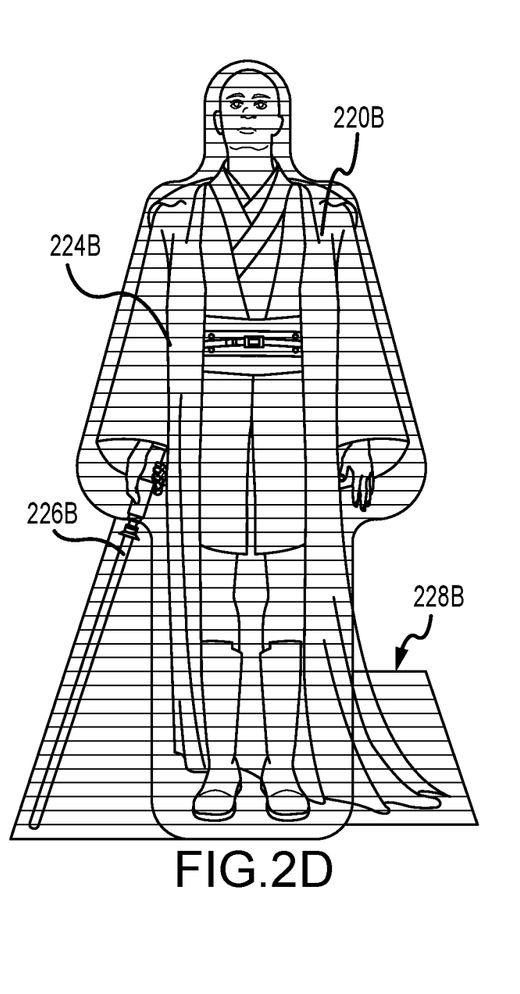
Figure 2E:
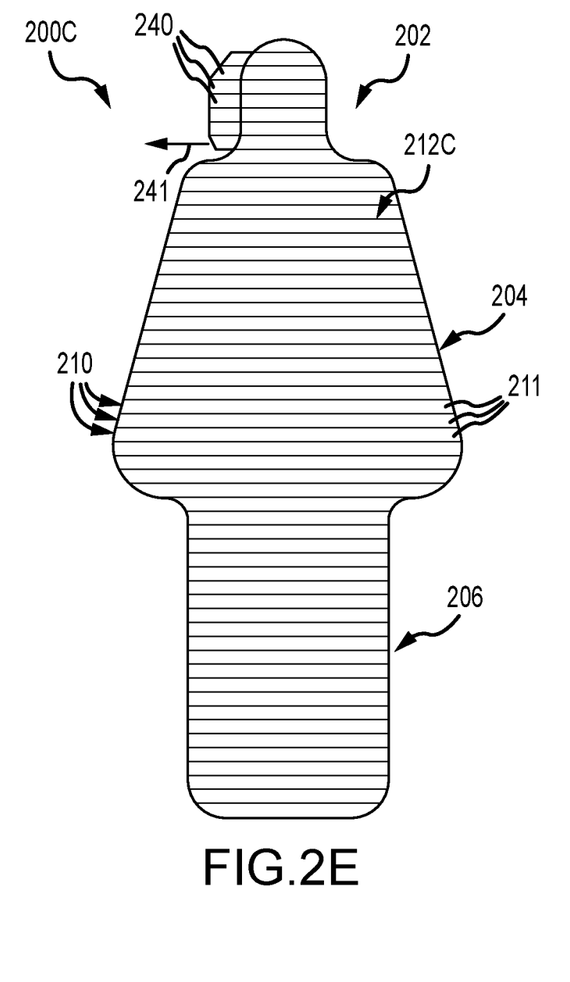
Figure 2F:
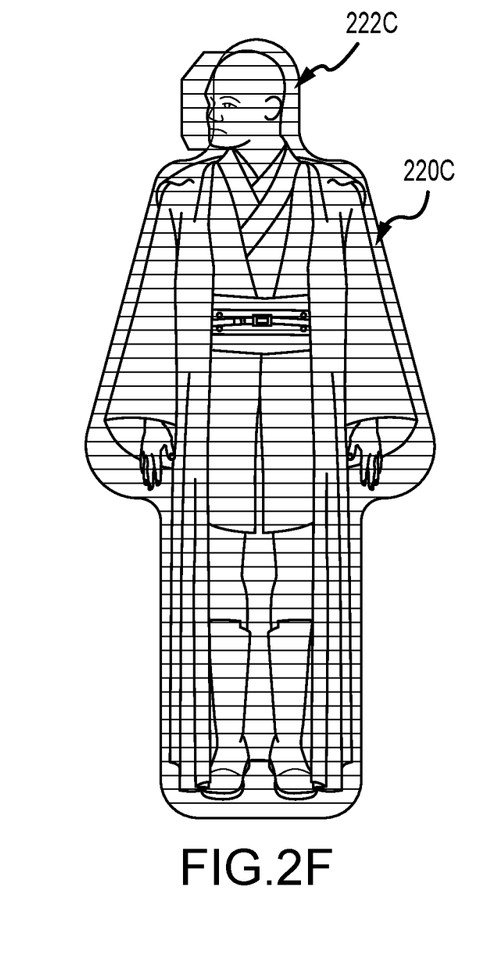

FIGS. 2A-2F illustrate one exemplary projection screen assembly that may be used as assembly 140 in the system 100 of FIG. 1 and that is shown in an initial or base state 200A prior to and after projection of video content in FIGS. 2A and 2B, in a second state 200B prior to and after projection of a second video content in FIGS. 2C and 2D, and in a third state 200C prior to and after projection of third video content in FIGS. 2E and 2F. In FIG. 2A, the projection screen assembly 200A is shown in an initial or first state to provide a base projection surface 212 with a first or base outline or silhouette having a first shape and size. The assembly 200A is made up of a plurality of extension assembly housings or support elements 210, e.g., C channels or other support elements, which may be attached to a central spine (not shown, but understood from FIG. 1 as, in many cases, being a linear or non-linear component extending centrally and vertically in the assembly 200A).

Each of the support elements 210 has outer ends or edges that when stacked as shown defined the outer dimensions or outline/silhouette of the projection surface 212, which is shown to include a head 202, a torso 204, and a lower portion 206 to support projection of a human or human like character in this non-limiting example. To form the base projection surface 212, each of the support elements 210 is covered with a segment or strip of projection material 211, and these segments or strips 211 are shown to be generally rectangular in shape and equal in size but other embodiments may vary the size and/or shape of these segments or strips 211 and/or the support elements 210 to implement the projection screen assembly 200A.

FIG. 2B illustrates the projection assembly 200A in the first or initial operating state but with a projector (not shown but understood from projector 130 in system 100 of FIG. 1) operating to project a first set of video content or media to provide a first projected image (or video image) 220A onto the base projection surface 212. As discussed above, the size and shape of the projected image 220A is configured to match the size and shape of the outline or silhouette of the projection surface 212 as defined by the screen material segments 211. Particularly, the projected image 220A includes a face 222A in a first state (e.g., looking forward or toward a viewing space) with a first size and shape chosen to match the face 202 of the projection surface 212, a pair of arms 224A in a first state (e.g., at the character's sides) with a first size and shape to fit onto the torso 204 of the projection surface 210, an object 226A held in the character's hand in a first state and location to fit into the torso 204, and a cloak 228 in a first state (e.g., only somewhat unfurled to provide a backdrop for the character's legs but also fit onto the lower portion 206 of the projection surface 212).

In FIG. 2C, the projection screen assembly 200B is shown in a second operating state to provide an extended or altered projection surface 212B. To this end, the torso and lower portions 204 and 206 may be modified or altered to have a greater width in desired locations, which coincide with one-to-many of the support elements 210. Particularly, as shown, the outline/periphery screen extension assemblies (e.g., assemblies 170 in FIG. 1) supported by a set of the support elements 210 are operated to extend outward, as shown by arrow 231, a set or plurality of screen material extensions 230. This extension 231 is synchronized in time and in amount (e.g., amount of size and/or shape change to the projection surface 212B) with the projection of a second set of video content by the projector to project the second (or second state) video image 220B. This image 220B includes a modified arm 224B that has moved to change the configuration of the character's hand and the location of the object 226B, which is shown to be extended, too, via projection onto the screen material extensions 230 (e.g., a hilt of an energy sword is moved, and its blade is shown in the image 220B after the sword is energized).

Further, as shown, the outline/periphery screen extension assemblies supported by a different set of the support elements 210 are operated to extend outward, as shown by arrow 233, a set or plurality of screen material extensions 232. This increases the size and shape of the lower portion 206 of the projection surface 212B (relative to the base projection surface 212A). This alteration is synchronized in time and in size and shape to suit to second projected image 220B with its modified cloak image 228B that is shown in FIG. 2D to be further unfurled and rippling adjacent to the character's leg (opposite the energized sword 226B, in this example). As shown, in FIGS. 2C and 2D, the projection surface 212B can be modified concurrently (or sequentially) on opposite sides of the assembly 200B and even within a single support element or rib 210 as each of these may support two of the outline/periphery screen extension assemblies. These extension assemblies are independently addressable and operable as noted with reference to the system 100 of FIG. 1 to precisely and selectively modify the base projection surface 212A.

In FIG. 2E, the screen extension assemblies that were used to extend outward the screen material extensions 230 and 232 have been operated to retract these extensions 230 and 232 to return the projection surface 212C to its base or original outline/silhouette in these areas. Further, though, the outline/periphery screen extension assemblies in the support elements 210 in the head 202 have been operated to modify the size and shape of the head 202 portion of the projection surface 212C. Particularly, as shown with arrow 241, screen material extensions 240 have been extended outward a plurality of distances (not the same distance for all screen extension assemblies in this case) to provide a different outline or profile for the head portion 202 of the third state or extended/altered projection surface 212C. As shown in FIG. 2F, this movement 241 is synchronized in time and size and shape with the operation of the projector to project a third set of video content/media to provide a third projected image 220C on the projection surface 212C. The image 220C includes a modified version of the character's face/head 222C in which the character has turned their head to the side rather than looking straight into the viewing space.

Figure 3A:
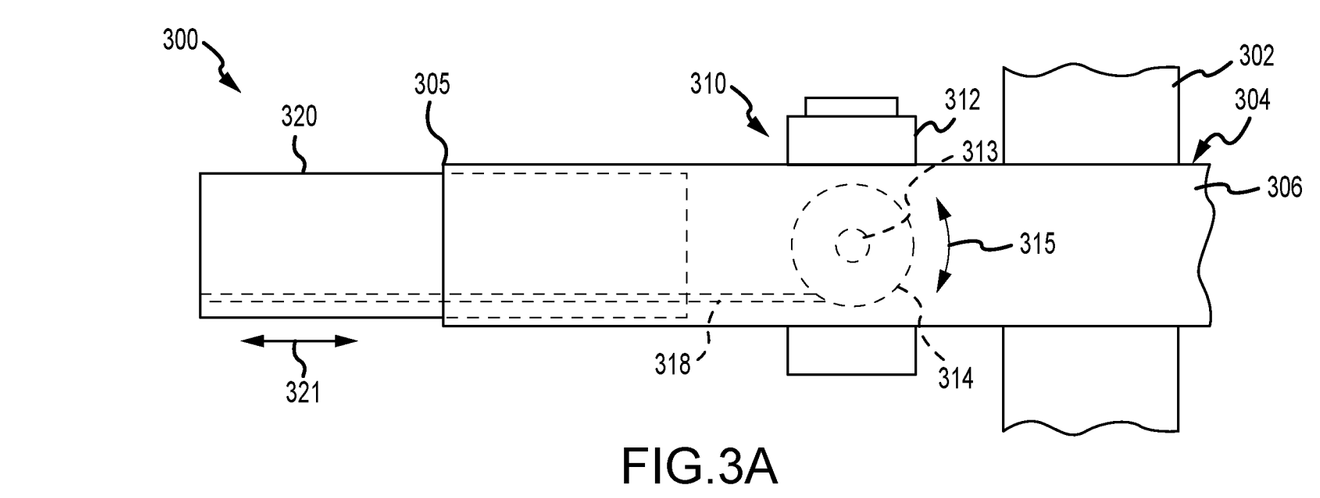
FIGS. 3A and 3B are front and top views, respectively, of a screen extension assembly as may be used in the system of FIG. 1 during operations to alter the projection surface outline shape and size.
Figure 3B:
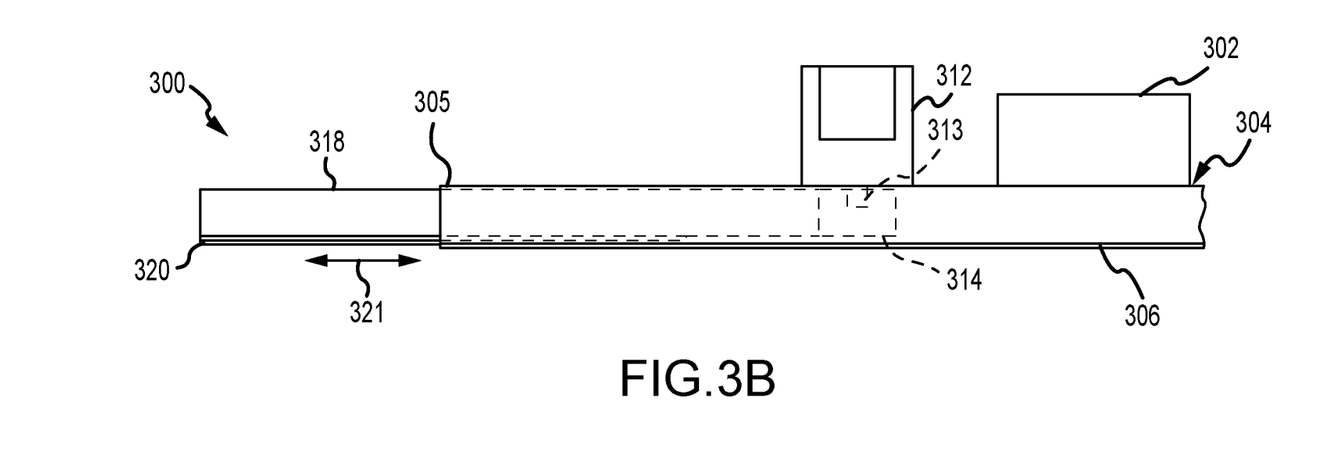

FIGS. 3A and 3B are front and top views, respectively, of a portion of a projection screen assembly 300 showing a screen extension assembly 310 as may be used in the system 100 of FIG. 1 to implement an extension assembly 170. The system 300 is partial in that a single rib or extension assembly housing/support element 304 is shown along with a single screen extension assembly 310, with the reader understanding that a projection screen assembly 300 typically would include numerous of these components stacked along a spine 302 (or other support frame). The system 300 is shown during operations to alter a base or initial projection surface's outline shape and/or size.

As shown, an extension assembly housing or support element 304 is provided in the form of a C channel, and the support element is attached or mounted to a spine 302 at a central location. The open end 305 of the C channel 304 is positioned a distance apart from the spine 302 and defines (when combined with other support elements 304 not shown in FIGS. 3A and 3B) an outer edge or outline of a projection surface. To this end, a screen material segment 306 is applied or attached to an outer surface (or central sidewall) of the support element 304 and configured to fully cover the support element 304 and extend fully out to the open end 305 (or along the entire length of the support element 304).

The screen extension assembly 310 is supported upon the support element (or C channel in this example) 304. The assembly 310 includes a driver 312 in the form of a servo motor operable to rotate a drive shaft 313. The drive shaft 303 is coupled with a spool 314 that rotates as shown by arrows 315 with the drive shaft 303. An extendable/retractable screen support 318 is shown to be coiled onto the spool 314 and to extend outward from the spool 314 within the C channel 304. A screen material extension 320 (e.g., a section of opaque plastic) is affixed to the outer end of the support 318 and moves as shown by arrows 321 with the support 318 from a retracted position wholly within the C channel 304 out to a fully or partially deployed or extended position. In this range of extended positions, the screen material extension 320 acts to alter the projection surface provided, in part, by the screen material segment 306. The length of the extension 320 exposed beyond the open end 305 is controlled by operations of the driver 312, which is synchronized with operations of a projector as discussed above. The height of the screen material extension 320 preferably is as large as practical to better match the height of the screen material segment 306 while still allowing it to be housed or supported within or upon the support element 304.

Figure 4A:
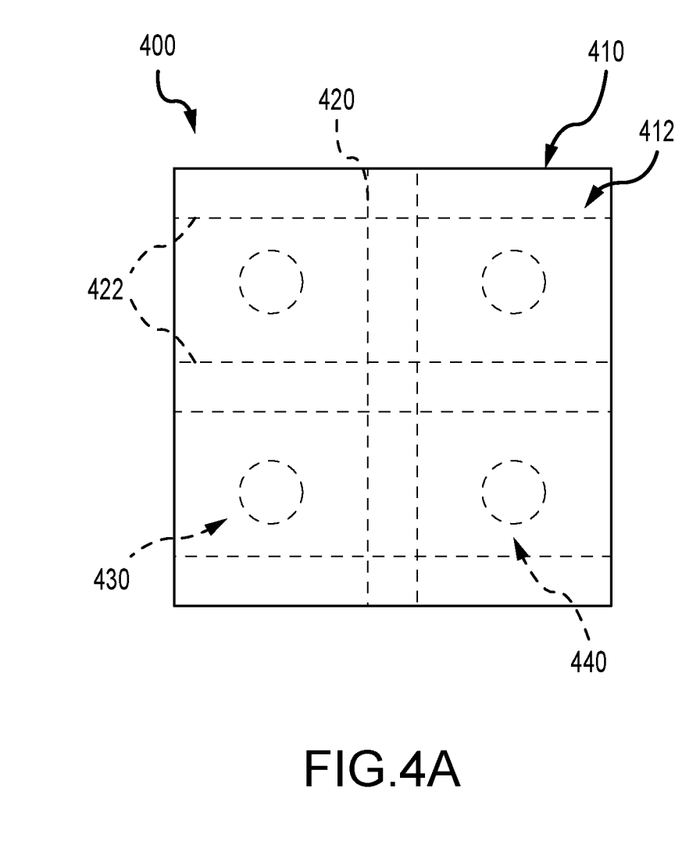
FIGS. 4A and 4B are front and bottom views, respectively, of a projection screen assembly that may be used in the system of FIG. 1 to provide a projection surface with alterable depth or 3D animation.
Figure 4B:
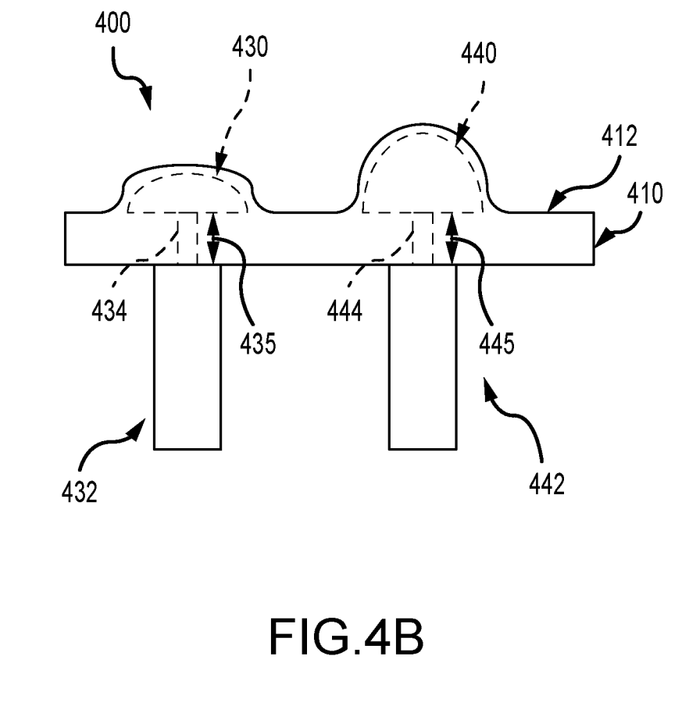

FIGS. 4A and 4B are front and bottom views, respectively, of a projection screen assembly 400 that may be used in the system of FIG. 1 to provide a projection surface 412 with alterable depth or 3D animation. As shown, the assembly 400 includes a screen support frame that includes a center spine 420 to which are attached several ribs or screen support elements 422 extending transverse to the longitudinal axis of the spine 420. These components of the support frame are covered by a screen material segment or cover 412 formed of an elastic and typically opaque material, and, during use, a projector would be operated to project onto a projection surface 412 provided by a portion of the segment/sheet 410 facing the projector and a viewing space. In an initial or base state, the projection surface 412 may be planar, e.g., resting against the support elements or ribs 422 or have some relatively small amount of depth or 3D aspects.

The assembly 400 further includes one or more 3D or depth screen extension assemblies operable to change the 3D shape or depth of the projection surface 412 over time (e.g., in synchronization with projected images having depth features matching the surface 412). FIG. 4A shows four end effectors positioned between the support elements or ribs 422 for use in moving into contact with and stretching or extending the cover or sheet of screen material 410, with 430 and 440 being shown in more detail in FIG. 4B. As shown, the extension assemblies each includes a driver 432 and 442 that may take the form of a linear actuator such as a pneumatic piston that is operable to move a piston rod 434, 444 toward and away, as shown with arrows 435 and 445, from the inner or back side of the screen material cover or sheet 410 to modify the 3D shape of the projection surface 412. Semispherical-shaped end effectors 430 and 440 are mounted on the ends of the piston rods 434 and 444. This abutting contact between the end effectors 430 and 440 and the screen material segment or cover 410 can be precisely controlled (e.g., by a controller 110 as shown in FIG. 1) to selectively alter the depth of the projection surface 412 in a time and depth synchronization with a video image projected by a projector onto the projection surface 412.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

I claim:

1. A system for providing visual special effects, comprising:
   a projector assembly operable to project a first image and a second image differing in size or shape;
   a projection screen assembly comprising a screen extension assembly and one or more screen material segments supported on a support frame to provide a base projection surface facing a viewing space; and
   a controller configured to operate the screen extension assembly in a first state to provide the base projection surface and in a second state to provide an extended projection surface including the base projection surface and differing from the base projection surface in at least one of size and shape, wherein the controller is further configured to operate the projector assembly to project the first image onto the base projection surface during operation of the screen extension assembly in the first state and to project the second image onto the extended projection surface during operation of the screen extension assembly in the second state,
   wherein the screen extension assembly comprises a plurality of drivers operable in response to control signals from the controller to move screen material extensions beyond a peripheral edge of the base projection surface to form portions of the extended projection surface.

2. The system of claim 1, wherein the first and second images are video images and wherein the controller operates the projector assembly to project transition content between the first and second images during the time period when the controller operates the screen extension assembly to transition between the first and second states.

3. The system of claim 1, wherein the one or more screen material segments comprises a sheet of elastic material and wherein the screen extension assembly is configured to stretch the sheet of elastic material in a direction transverse to the base projection surface to provide a three-dimensional (3D) shape in the extended projection surface that differs from the 3D shape of the base projection surface.

4. The system of claim 3, wherein the screen extension assembly comprises a driver operating in response to control signals to move an end effector toward and away from an inner surface of the sheet of elastic material to create a raised portion in the extended projection surface.

5. The system of claim 4, wherein the end effector has a curved surface facing or abutting the inner surface of the sheet of elastic material.

6. The system of claim 1, wherein the screen extension assembly comprises a plurality of extendable screen supports each mounted on the support frame and each supporting a screen material extension, a respective driver of the plurality of drivers is operable in response to a control signal from the controller to provide linear movement of one of the extendable screen supports to extend at least a portion of one of the screen material extensions beyond the peripheral edge of the base projection surface to form the portions of the extended projection surface.

7. The system of claim 6, wherein the linear movement is in a plane parallel to a plane containing the base projection surface.

8. The system of claim 6, wherein the plurality of extendable screen supports are each housed within a C channel, wherein the drivers each comprises a servo motor, and wherein the drivers are independently operable by the controller.

9. A method of providing visual special effects for a viewer in a viewing space, comprising:
providing a screen assembly with a projection surface in a first state with a first size and shape;
projecting a first video image onto the projection surface in the first state, wherein the first video image is configured to match the first size and shape of the projection surface;
operating the screen assembly to transition the projection surface into a second state with a second size and shape differing from the first size and shape; and
projecting a second video image onto the projection surface in the second state, wherein the second video image is configured to match the second size and shape of the projection surface,
wherein the operating the screen assembly comprises concurrently operating two or more drivers to move screen material extensions to positions outside a peripheral edge of the projection surface in the first state, whereby at least a portion of the second video image is projected upon the screen material extensions positioned outside the peripheral edge.

10. The method of claim 9, wherein the projection surface in the first state is planar and wherein the projection surface in the second state is substantially planar.

11. The method of claim 9, wherein the screen assembly includes an elastic screen providing the projection surface on a first side and wherein the operating the screen assembly comprises operating a driver to move an end effector against a second side of the elastic screen to alter a 3D shape of the projection surface from the first to the second state.

12. The method of claim 9, further comprising a transition video image during the operating step while the projection surface is transitioned between the first and second states.

13. A system for providing visual special effects, comprising:
a projection screen assembly comprising a screen extension assembly and one or more screen material segments supported by a support frame and configured to have a first size and shape to provide a base projection surface; and
a controller generating control signals to first operate the screen extension assembly to provide the base projection surface and to second operate the screen extension assembly to generate an extended projection surface that includes the base projection surface and one or more screen material extensions extending outward from a peripheral edge of the base projection surface,
wherein the screen extension assembly comprises a plurality of drivers operable in response to control signals from the controller to move the one or more screen material extensions beyond the peripheral edge of the base projection surface to form portions of the extended projection surface.

14. The system of claim 13, wherein the controller is further configured to operate a projector assembly to project a first image onto the base projection surface during the first operating of the screen extension assembly and to project a second image differing from the first image onto the extended projection surface during the second operating of the screen extension assembly.

15. The system of claim 13, wherein the screen extension assembly comprises a plurality of extendable screen supports each supporting one of the screen material extension, and wherein a respective driver of the plurality of drivers is operable in response to a control signal from the controller to provide linear movement of one of the extendable screen supports to extend at least a portion of one of the screen material extensions beyond the peripheral edge of the base projection surface to form the portions of the extended projection surface.

16. The system of claim 15, wherein the linear movement is in a plane parallel to a plane containing the base projection surface.

17. The system of claim 15, wherein the plurality of extendable screen supports are each housed within a C channel.

18. The system of claim 15, wherein the drivers each comprises a servo motor.

19. The system of claim 15, wherein the drivers are independently and concurrently operable by the controller.

* * * * *